United States Patent
Kan

(10) Patent No.: US 9,081,759 B2
(45) Date of Patent: Jul. 14, 2015

(54) IMAGE PROCESSING APPARATUS, IMAGE PROCESSING SYSTEM AND IMAGE PROCESSING METHOD

(75) Inventor: Nariyasu Kan, Kyoto (JP)

(73) Assignee: MURATA MACHINERY LTD., Kyoto-Shi (JP)

( * ) Notice: Subject to any disclaimer, the term of this patent is extended or adjusted under 35 U.S.C. 154(b) by 393 days.

(21) Appl. No.: 13/342,852

(22) Filed: Jan. 3, 2012

(65) Prior Publication Data

US 2012/0189202 A1  Jul. 26, 2012

(30) Foreign Application Priority Data

Jan. 20, 2011  (JP) .................................. 2011-009588

(51) Int. Cl.
*G06F 17/24* (2006.01)
(52) U.S. Cl.
CPC .................................... *G06F 17/241* (2013.01)
(58) Field of Classification Search
CPC ............ G06F 17/3087; G06F 3/04883; G06F 17/30256; G06F 17/241; G06F 9/4642
See application file for complete search history.

(56) References Cited

U.S. PATENT DOCUMENTS

| | | | |
|---|---|---|---|
| 5,689,717 A * | 11/1997 | Pritt .............................. | 715/234 |
| 6,279,014 B1 | 8/2001 | Schilit et al. | |
| 7,519,901 B2 | 4/2009 | Price et al. | |
| 2004/0205542 A1 * | 10/2004 | Bargeron et al. ............. | 715/512 |
| 2004/0252888 A1 * | 12/2004 | Bargeron et al. ............. | 382/188 |
| 2004/0255242 A1 * | 12/2004 | Price et al. .................... | 715/512 |
| 2005/0055628 A1 * | 3/2005 | Chen et al. .................... | 715/512 |
| 2005/0183005 A1 * | 8/2005 | Denoue et al. ................ | 715/512 |
| 2005/0289452 A1 * | 12/2005 | Kashi et al. ................... | 715/512 |
| 2006/0010368 A1 * | 1/2006 | Kashi ............................. | 715/512 |
| 2006/0218484 A1 * | 9/2006 | Saito et al. .................... | 715/512 |
| 2006/0224950 A1 * | 10/2006 | Takaai et al. .................. | 715/512 |
| 2008/0119235 A1 * | 5/2008 | Nielsen et al. ................ | 455/566 |
| 2010/0309527 A1 * | 12/2010 | Mandalapu et al. .......... | 358/402 |

FOREIGN PATENT DOCUMENTS

| | | |
|---|---|---|
| JP | 11-219245 | 8/1999 |
| JP | 2004-166062 | 6/2004 |
| JP | 2005011340 | 1/2005 |
| JP | 2006-301695 | 11/2006 |

* cited by examiner

*Primary Examiner* — Jingge Wu
(74) *Attorney, Agent, or Firm* — Adli Law Group P.C.

(57) ABSTRACT

A handwritten area is separated from image data of printed material in which handwriting has been inserted, and the separated handwritten area is identified as an enclosing line or a class symbol. An image area enclosed within the handwritten area identified as the enclosing line is extracted and acquired as an extracted image. The class symbol is correlated to an enclosing line drawn nearest the class symbol, and the extracted images are classified into groups according to the image areas within the enclosing line correlated to the type of class symbols. The grouped images are organized as listed data.

18 Claims, 16 Drawing Sheets

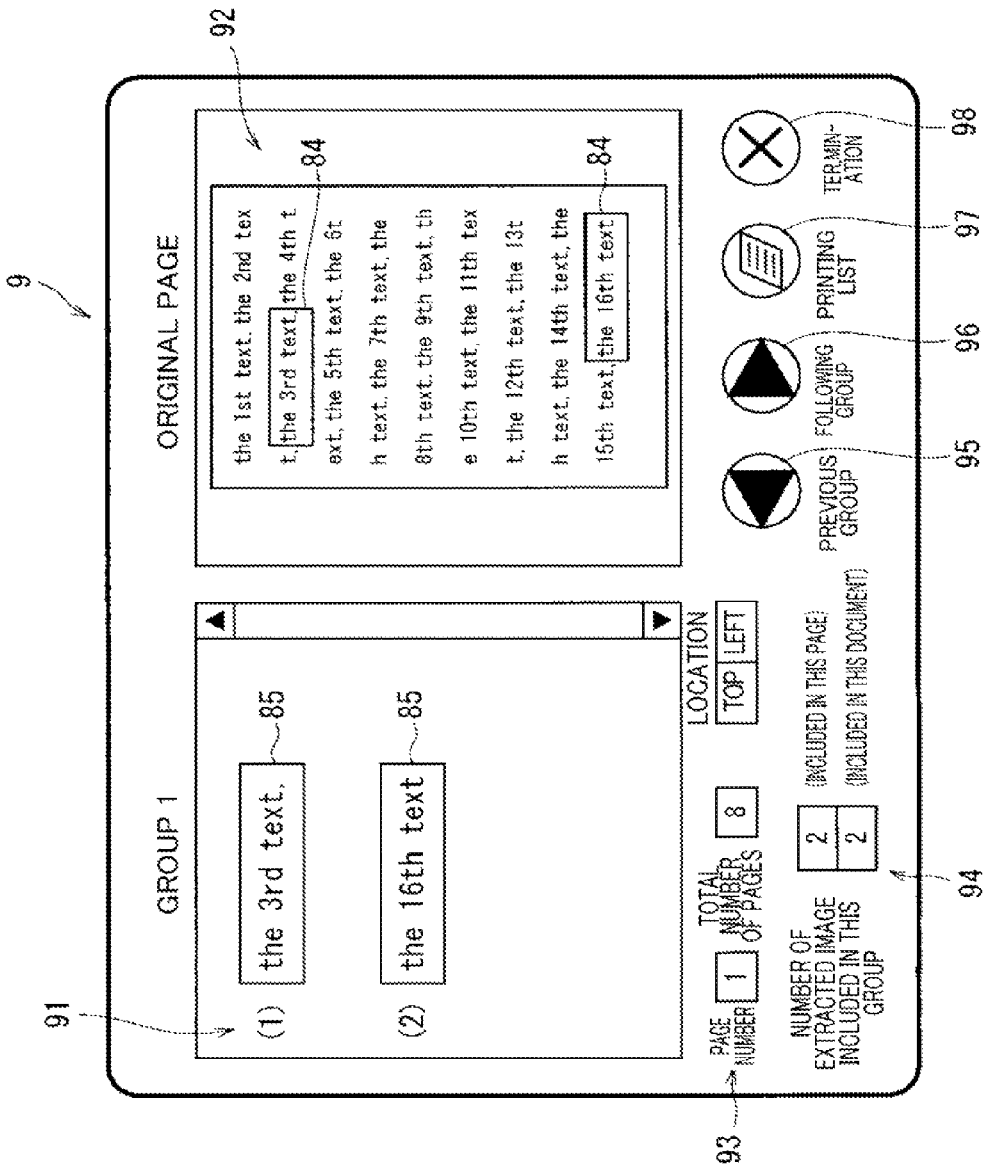

IMAGE PROCESSING APPARATUS, IMAGE PROCESSING SYSTEM AND IMAGE PROCESSING METHOD

CROSS-REFERENCE TO RELATED APPLICATIONS

This application claims priority under 35 U.S.C. 119 to Japanese Patent Application No. 2011-009588, filed on Jan. 20, 2011, the application of which is hereby incorporated by reference in its entirety.

BACKGROUND OF THE INVENTION

1. Field of the Invention

The present invention relates to a technology of extracting a specific area from image data and organizing list data of the extracted areas.

2. Description of the Related Art

In terms of improving work efficiency or facilitating document management, there exist various situations in which a person wants to generate a list of specific areas extracted from printed material. For example, after looking quickly at printed material and putting a mark thereon while doing proofreading, a person sometimes wants to think over a necessity for modifying some areas later. In this case, if it is possible to extract the marked areas only and organize a list thereof, proofreading can be performed accurately and efficiently. Further, when reading reference materials in order to write a thesis or the like, a person generally marks up an area (e.g., a portion considered important, a portion related to a theme of the thesis, a portion to be cited, etc.), that is, the area which he/she wants to refer to later. If extracting only the marked areas and organizing them into a list is made possible, the efficiency can improve in writing a document such as a thesis.

Further, it is more convenient if extracted areas are organized into a list of groups according to an element of the extracted areas instead of merely extracting each area from the printed material according to the order of markings thereon. In an example stated above, where areas related to one theme coexist with areas related to another theme in the original printed material, it is very convenient and efficient to review the extracted areas under different themes.

A structure is conventionally known in which a sentence adjacent to a mark is automatically extracted from among other annotation symbols (vertical bar, star mark (asterisk), circle, underline, highlight) inserted by a user.

SUMMARY OF THE INVENTION

A region which a user wants to extract may be one word in a sentence, or a plurality of sentences. Alternatively, the region may be a combination of a sentence and a figure (or a graph.)

In a conventional technology, a system automatically decides a region to be extracted. In other words, the system first decides a minimum context pertaining to a marking. Meanwhile, as the system divides text into sections in advance, the system extends the area to be extracted so as to include all divisions nearby once the minimum context is decided.

The above described configuration could often cause the following inconvenience: a wider region than a user wants is extracted, or a narrower region than a user wants is extracted. In the former case, a size of listed data becomes larger unnecessarily, which eventually decreases work efficiency. In the latter case, as a user eventually needs to review an original document again, it is no use trying to organize the list data of extracted areas.

The present invention has been made to solve the above-described problems, and an object of the present invention is to provide a technology capable of extracting only specific areas which a user wants to extract and also capable of organizing list data of the extracted areas as desired by the user.

Problems to be solved by the present invention have been described above. Next, means for solving the problems and effects thereof will be described.

An image processing apparatus according to the present invention includes a separating section, a determining section, a corresponding section, an extracted image acquiring section, an image classifying section and a listed data generating section. The separating section separates a handwritten area of printed material, in which handwriting has been inserted, from image data. The determining section determines whether the handwritten area is an enclosing line enclosing a target region of the printed material or a class symbol classifying the target region. The corresponding section correlates a class symbol to an enclosing line which has been drawn nearest the class symbol. The extracted image acquiring section extracts image areas in an extract target region including the target region within the enclosing line from the data which the handwritten area has been separated from the image data. The image classifying section classifies the image areas which are within each of one or more of the enclosing lines correlated to the same kind of the class symbols into groups. The listed data generating section generates listed data in which the image areas extracted are classified into groups.

The image processing apparatus according to the present invention includes a circumscribed rectangle creating section arranged to create a circumscribed rectangle around the handwritten area. It is preferred that the determining section determines whether the handwritten area of the separated data is an enclosing line or a class symbol based on the number of pixels included in a region enclosed with the circumscribed rectangle created around the handwritten area.

The image processing apparatus according to the present invention includes the circumscribed rectangle creating section arranged to create a circumscribed rectangle around the handwritten area. It is preferred that when an inscribed rectangle whose size is larger than a predetermined threshold can be created in a region between the enclosing line and the circumscribed rectangle created therearound, the extracted image acquiring section regards as an extract target region a region after a removal of the inscribed rectangle from the circumscribed rectangle; and where the inscribed rectangle cannot be created in the region between the enclosing line and the circumscribed rectangle created therearound, the extracted image acquiring section regards as the extract target region the region of the circumscribed rectangle.

The image processing apparatus according to the present invention includes the circumscribed rectangle creating section arranged to create a circumscribed rectangle around the handwritten area, and a location information acquiring section arranged to acquire a central location of the circumscribed rectangle created around the handwritten area as location information thereof. It is preferred that the corresponding section identifies an enclosing line which has been drawn nearest a class symbol based on the location information of each handwritten area.

It is preferred that the image processing apparatus according to the present invention include's a display device and a display controlling section arranged to display the listed data thereon.

An image processing system according to the present invention includes the image processing apparatus and an information processing device connected to the image processing apparatus via a communication line. The image processing apparatus includes the separating section, the determining section, the corresponding section, the extracted image acquiring section, the image classifying section and the listed data generating section. The separating section separates a handwritten area of printed material, in which handwriting has been inserted, from the image data. The determining section determines whether the handwritten area is an enclosing line enclosing a target region of the printed material or a class symbol classifying the target region. The corresponding section correlates a class symbol to an enclosing line which has been drawn nearest the class symbol. The extracted image acquiring section extracts an image area of an extract target region including the target region within the enclosing line from the data in which the handwritten area has been separated from the image data. The image classifying section classifies the image areas which are within each of one or more of the enclosing lines correlated to the same kind of class symbols into groups. The listed data generating section generates listed data in which the image areas extracted are organized into groups according to the kind of class symbol. The information processing device includes the display device and the display controlling section. The display controlling section displays the listed data acquired from the image processing apparatus via the communication line on the display device.

An image processing means according to the present invention includes a separating step, a determining step, a corresponding step, an extracting step, a grouping step and a listed-data generating step. In the separating step, a handwritten area of printed material in which handwriting has been inserted is separated from image data. In the determining step, it is determined whether the handwritten area is an enclosing line enclosing a target region of the printed material or a class symbol classifying the target region. In the corresponding step, a class symbol is correlated to an enclosing line which has been drawn nearest the class symbol. In the extracting step, an image area of the extract target region including the target region within the enclosing line is extracted from the separated data in which the handwritten area has been separated from the image data. In the grouping step, the image areas which are within each of one or more of the enclosing lines correlated to the same kind of class symbol are classified into groups. In the listed-data generating step, listed data in which the extracted image areas are classified into groups is generated.

A program according to the present invention is a computer-readable program. A computer allow the image processing apparatus to operate the separating section, the determining section, the corresponding section, the extracted image acquiring section, the image classifying section and the listed data generating section by reading and executing the program with a central processing unit (CPU) of the computer. The separating section separates a handwritten area of printed material in which handwriting has been inserted from image data. The determining section determines whether the handwritten area is an enclosing line enclosing a target region of the printed material or a class symbol classifying the target region. The corresponding section correlates a class symbol to an enclosing line which has been drawn nearest the class symbol. The extracted image acquiring section extracts the image area of the extract target region including the target region within the enclosing line from the image data in which the handwritten area has been separated. The image classifying section classifies the image areas within each of one or more of the enclosing lines correlated to the same kind of class symbols into groups. The listed data generating section generates listed data in which the extracted image areas are classified into groups according to the kind of class symbol.

According to the present invention, a handwritten area separated from image data is identified as an enclosing line or a class symbol, and an image area of an extract target region including a target region enclosed with the handwritten area identified as an enclosing line is extracted. The extracted image areas are classified into groups of the image areas within one or more of the enclosing lines correlated to the same kind of class symbols, and are organized as listed data. This configuration allows a user to extract a specific area which the user wants to extract from data of the printed material and to generate listed data by classifying the extracted areas as desired by the user.

According to the present invention, it is determined whether each handwritten area of the separated data is an enclosing line or a class symbol based on the number of pixels included in a region enclosed with a circumscribed rectangle created around the handwritten area. According to the configuration, as it is determined whether the handwritten area is an enclosing line or a class symbol with a simple form of a circumscribed rectangle, the determination can be easily and accurately achieved.

According to the present invention, where an inscribed rectangle whose size is larger than the predetermined value can be created in a region between an enclosing line and a circumscribed rectangle, an image area of the region after the removal of the inscribed rectangle from the circumscribed rectangle is regarded as an extract target region; and where the inscribed rectangle cannot be created in the region, the region of the circumscribed rectangle is regarded as the extract target region. According to the configuration, a region that a user wants to extract can be easily and accurately identified with a simple form of a circumscribed rectangle.

According to the present invention, a central location of a circumscribed rectangle created around a handwritten area is acquired for location information on the handwritten area, and an enclosing line which has been drawn nearest a class symbol is identified based on the location information. According to the configuration, as a location of each handwritten area can be easily and accurately identified with a simple form of a circumscribed rectangle, correlating a class symbol to an enclosing line can be also easily and accurately achieved.

According to the present invention, an image processing apparatus includes a display device and a display controlling section that allows the display device to display the listed data thereon, which enables the user to display the listed data on the display device.

According to the present invention, the information processing device connected to an image processing apparatus includes the display device and the display controlling device that uses the display device to display listed data thereon. This enables the user to display the listed data generated with the image processing apparatus on a display device provided in a different information processing device.

Other features, elements, processes, steps, characteristics, and advantages of the present invention will become more apparent from the following detailed description of preferred embodiments of the present invention with reference to the attached drawings.

BRIEF DESCRIPTION OF THE DRAWINGS

FIG. 16 is a view illustrating an example of a display screen.

DETAILED DESCRIPTION OF PREFERRED EMBODIMENTS

A. First Embodiment

1. Structure of a Digital Multifunctional Machine

Figure 1:
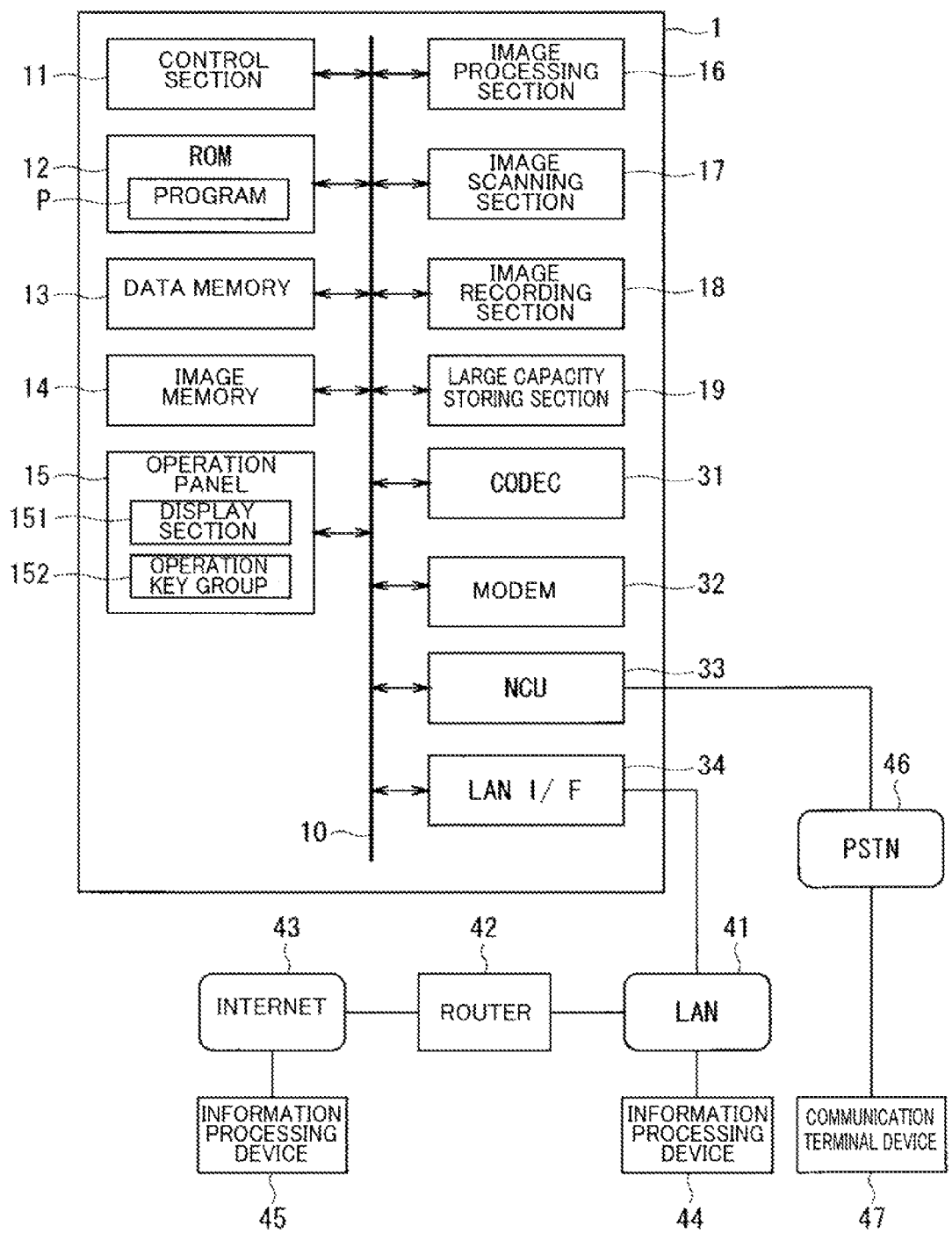
FIG. 1 is a view illustrating a configuration of a digital multifunctional machine.

FIG. 1 is a view illustrating a structure of a digital multifunctional machine 1 according to an embodiment of the present invention. An example of the digital multifunctional machine 1 is a multifunction peripheral printer (MFG device) having a facsimile function, a copy function, a scanning function, a printing function and the like.

The digital multifunction machine 1 includes a control section 11, a read-only memory (ROM) 12, a data memory 13, an image memory 14, an operation panel 15, an image processing section 16, an image scanning section 17, an image recording section 18, a large capacity storing section 19, communication-related processing sections 31 to 34, all of which are electrically connected via a bus line 10.

The control section 11 is equipped with a CPU. The control section 11 controls each hardware described above based on a program P stored in the ROM 12 to perform a function of the digital multifunction machine 1.

The ROM 12 is a read-only storage device that stores the program P required to control the digital multifunction machine 1, data and the like having been stored.

The data memory 13 is a writable and readable storage device and temporarily stores various data, including image data, a facsimile number, an electronic mail address, all of which are temporarily stored, and data generated in an arithmetic processing with the control section 11. The data memory 13 is preferably a static random memory (SRAM), a flash memory or the like.

The image memory 14 is a storage device that temporarily stores image data received from an external device via a local region network interface (LAN I/F) 34 or a network control unit (NCU) 33, image data acquired at the image scanning section 17, or image data processed at the image processing section 16. The image memory 14 is a memory such as a dynamic random-access memory (DRAM) which is readable and writable.

The operation panel 15 is a processing unit which serves as a user interface. The operation panel 15 includes a display section 151 and an operation key group 152.

The display section 151 displays various kinds of information and also accepts a user operation. The display section 151 includes a display panel and a touch panel attached thereto. The display panel is a device to display an operational state or the like of the digital multifunction machine 1, and consists of a liquid crystal panel, for example. The touch panel senses a finger touch or the like on a display screen of the display panel and acquires information from the contact.

The operation key group 152 consists of various keys including character keys, numerical keys, function keys and accepts a user operation, including an input of a command or text data. The user operation input to the operation key group 152 is input to the control section 11 as a signal. The control section 11 controls an operation of each section in accordance with the user operation.

The image processing section 16 is a processing unit arranged to perform various types of processing, such as, analog-to-digital (A/D) conversion of image data received and image data acquired from the image scanning section 17, color system conversion, color adjustment, image composition or the like.

The image scanning section 17 scans an image of an original document using a scanning element such as a charge-coupled device (CCD) line sensor. The image scanning section 17 may be a scanner in which a scanning element scans a surface of an image placed on a glass, or a scanner in which a stationary scanning element scans a surface of an image of an original document on a glass (not illustrated) while the original document is being transported with an automatic document feeder (ADF).

The image recording section 18 prints image data or the like stored in the image memory 14 or the large capacity storing section 19 on a recording sheet. The image recording section 18 may employ an electrophotographic printer, for example.

The large capacity storing section 19 consists of a hard disc or the like. The large capacity storing section 19 is capable of storing image data processed at the image scanning section 17.

The digital multifunction machine 1 also includes, as a communication-related processing section, a coder and decoder (CODEC) 31 that encodes/decodes image data or the like by corresponding to a plurality of protocols, a modem 32 that modulates/demodulates transmitted/received data, a NCU 33 that controls a switching (opening and closing) of a telephone line, and the LAN I/F 34 equivalent to an interface with the LAN 41, all of which are electrically connected via the bus line 10.

Communication environment of the digital multifunction machine 1 will be described hereafter. The digital multifunction machine 1 is connected to the LAN 41. Further, the LAN 41 is connected to the Internet 43 via a router 42 or the like. Accordingly, the digital multifunction machine 1 can transmit/receive an electronic mail or the like to/from the information processing device 44 connected via the LAN 41 or the information processing device 45 connected via the Internet. Herein, the information processing devices 44 and 45 are, for example, a personal computer, a device equivalent to the digital multifunction machine 1, or a cellular telephone.

Furthermore, the digital multifunction machine 1 is connected to a line which is a data communication network for an analog line 46 (for example, a public switched telephone network, PSTN or an integrated services digital network, ISDN.) The connection thus allows the digital multifunction machine 1 to receive/transmit a facsimile from/to the communication terminal device 47 connected via the line 46. The communication terminal device 47 may be a personal computer connected to a modem, a device equivalent to the digital multifunction machine 1, a fixed-line (traditional) telephone, a cellular phone, a fax-dedicated device or the like.

2. Configuration with Respect to Image Extracting

The digital multifunction machine 1 includes functions of extracting an area from the data of printed material where handwriting by a pencil or ballpoint pen has been inserted (hereinafter referred to as "handwriting inserted original document" 60); and classifying the extracted areas as desired by a user to generate listed data of the extracted areas. (Extract classifying function)

2-1. Handwriting Inserted Original Document

Figure 2:
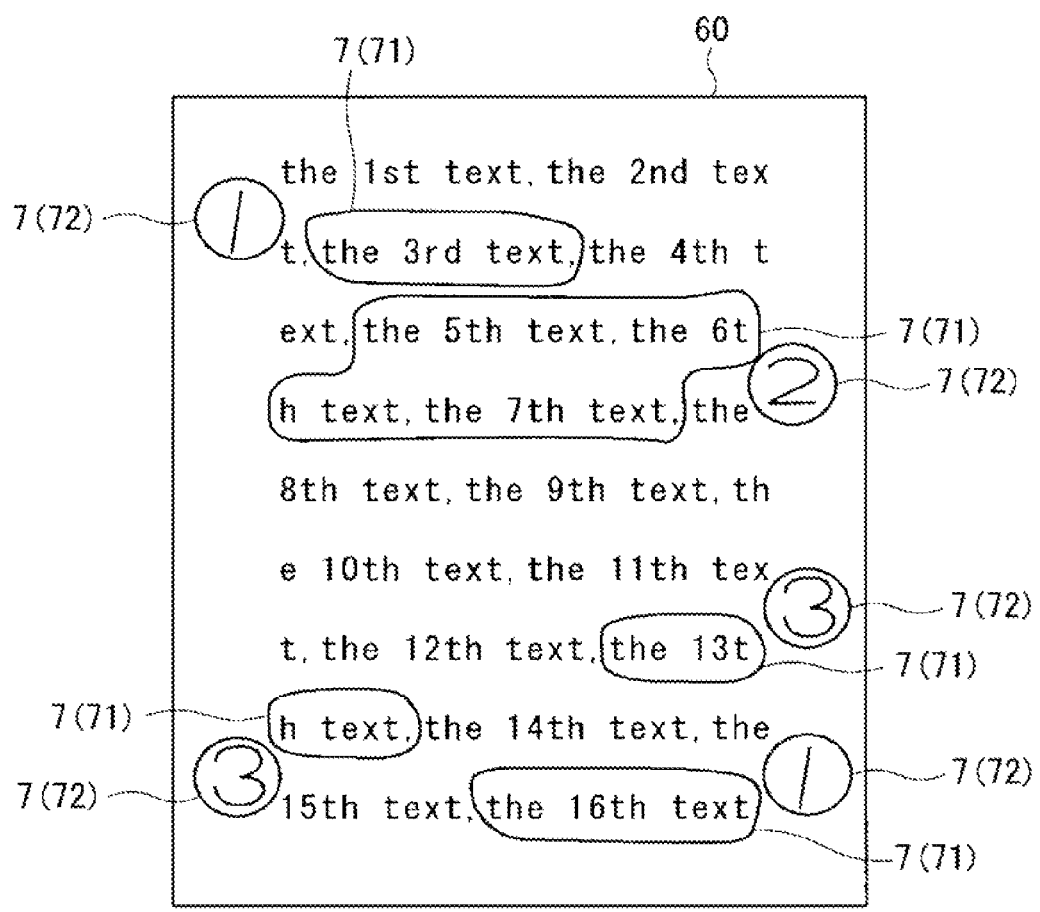
FIG. 2 is a view illustrating an example of an original document in which handwriting has been inserted.

Prior to specifically describing the extract classifying function, the handwriting inserted original document 60 will be hereafter described with reference to FIG. 2 illustrating an example of the handwriting inserted original document 60.

As described above, the handwriting inserted original document 60 refers to printed material on which a user has inserted handwriting. Herein, "printed material" refers to, for example, recording medium, including a recording sheet or the like. On the printed materials may be characters or images including figures or graphs drawn with ink or toner.

Enclosing Line 71

When there is a region which a user wants to extract from printed material (hereinafter referred to as "target region"), the user draws a line enclosing the target region (hereinafter referred to as "enclosing line" 71). The enclosing line 71 may be of any shape which defines a closed region. For example, it may be a polygon, a polygon with rounded corners, a circle, or an oval or the like. Further, the enclosing line 71 may be of an irregular shape, including a dimpled portion or a protruding shape. Furthermore, in any printed material, the number of the enclosing lines 71 is not limited. However, in a case where a plurality of enclosing lines 71 will be inserted on the printed material, each enclosing line 71 needs to be drawn without intersecting each other.

Class Symbol 72

In this example, the user handwrote a symbol (hereinafter referred to as "class symbol" 72) nearby an enclosing line 71 to classify the target regions. The class symbol 72 may be any symbol which is distinguishable. For example, the following can be used as a class symbol 72: characters for example, one or a combination of a plurality of figures, alphabet, Japanese hiragana, or katakana), writing marks (for example, question mark [?], exclamation mark [!], and the like), reference marks (for example, asterisk [*], or the like), mathematical marks (for example, equal [=], plus [+], minus [−] or the like), drawings (for example, one or a combination of a circle, triangle, square or other figures), a combination of characters and a drawing(s) (for example, a character in a circle). However, as the class symbols 72 are recognized in an optical character recognition processing, it is preferred that the class symbols 72 do not match with each other if rotated, to prevent a recognizing error in the optical character recognition processing.

Further, since a class symbol 72 is correlated to an enclosing line 71 located nearest the class symbol 72, it is preferable to draw the class symbol 72 as close as possible to the correlated enclosing line 71. However, the class symbol 72 needs to be drawn so as not to overlap with any of the enclosing lines 71 or the other class symbols 72. It is also preferred that the class symbol 72 is drawn so as not to overlap with any line printed on printed material. The enclosing lines 71 do not necessarily have a corresponding class symbol 72. It does not matter if there is an enclosing line 71 without a class symbol 72.

2-2. Functional Structure

Figure 3:
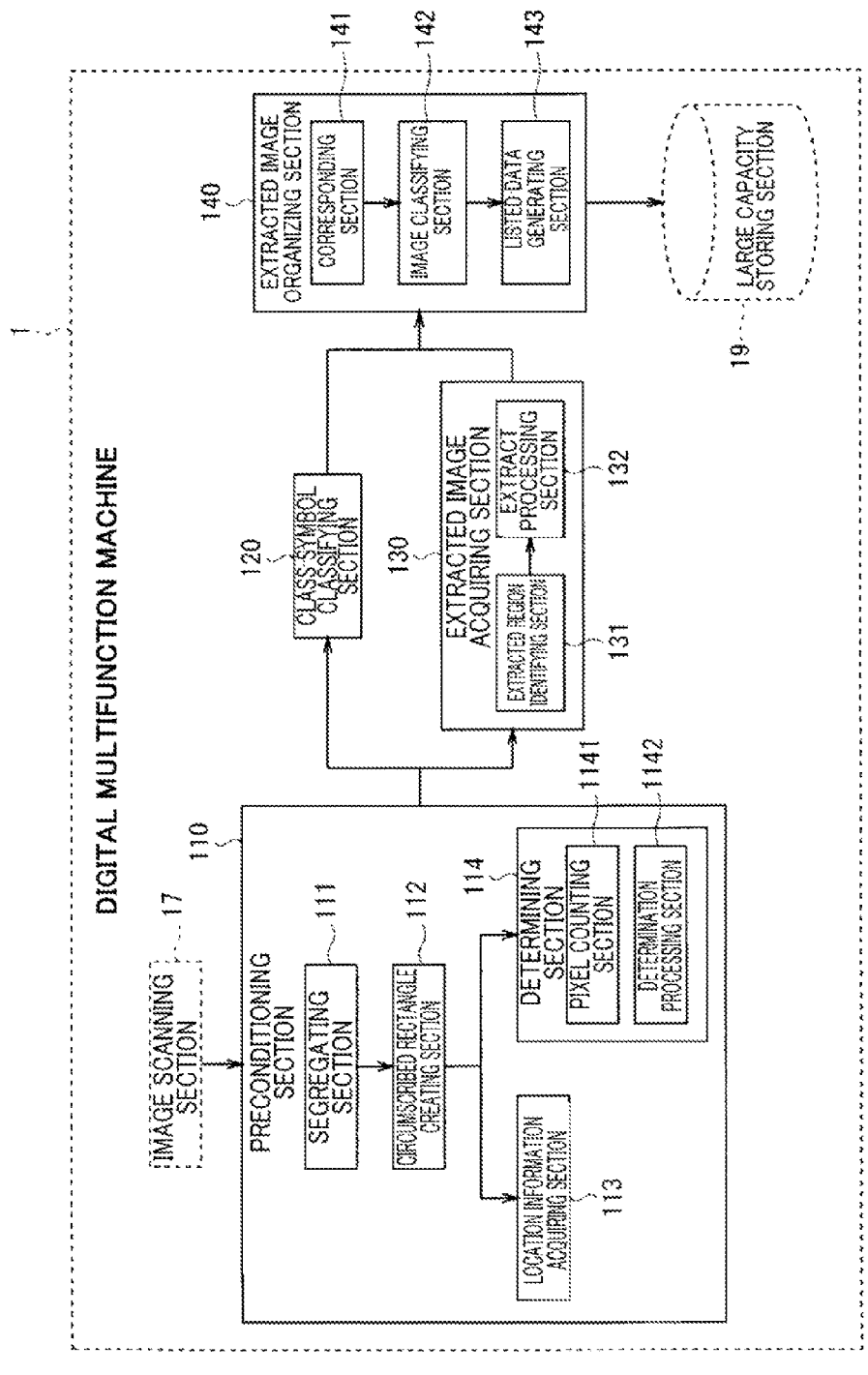
FIG. 3 is a block diagram illustrating a functional structure of the digital multifunctional machine.

The extract classifying function will be hereafter described with reference to FIG. 3 which is a block diagram illustrating a functional structure of the digital multifunctional machine 1.

As a configuration with respect to the above described function, the digital multifunction machine 1 includes a preconditioning section 110, a class symbol classifying section 120, an extracted image acquiring section 130 and an extracted image organizing section 140. An operation of each section is performed when a control section 11 executes program P on ROM 12.

Preconditioning Section 110

Figure 4:
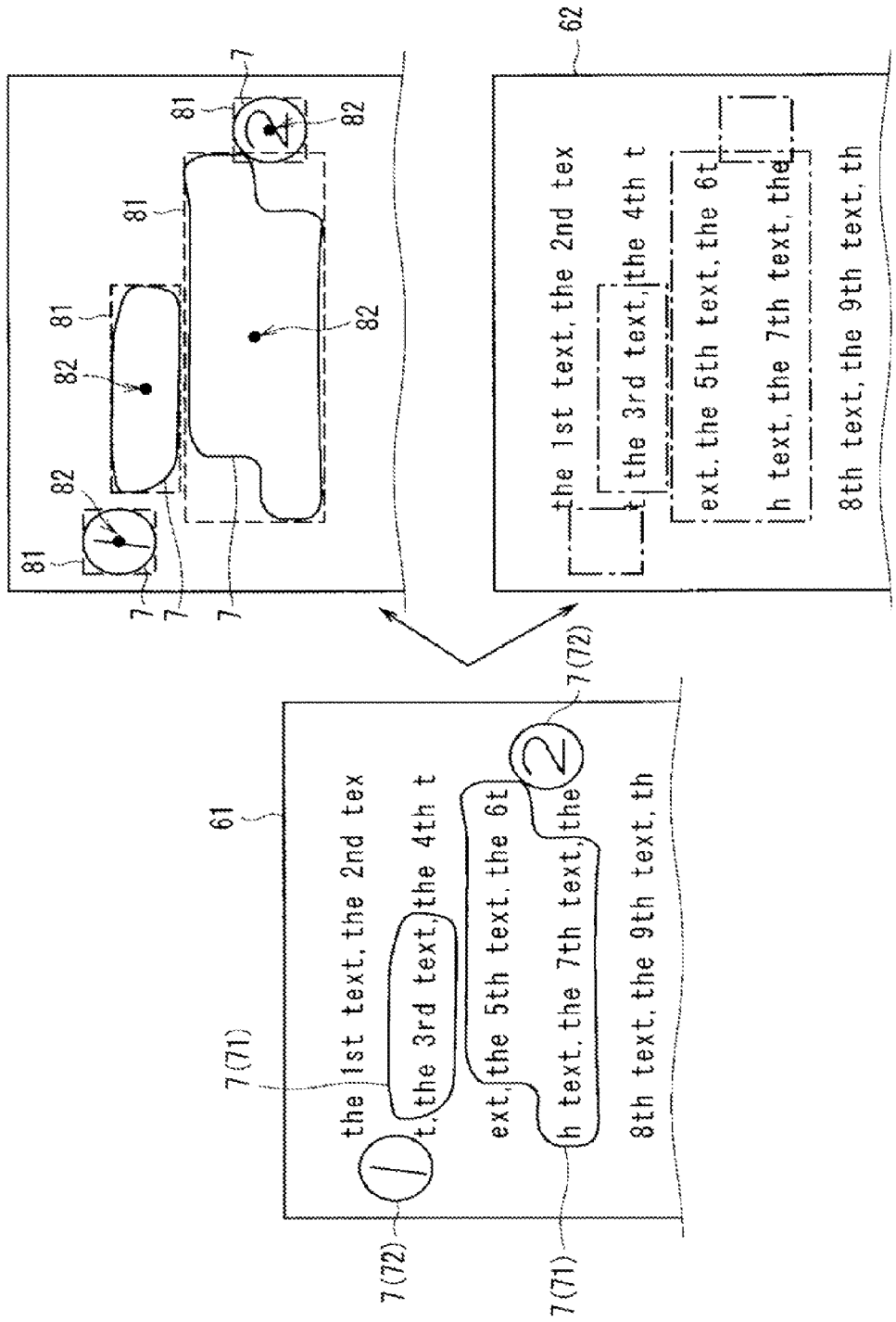
FIG. 4 is a view describing a function of a preconditioning section.

The preconditioning section 110 is a functional section arranged to acquire from image data various information on an area where a user has inserted handwriting (hereinafter referred to as "handwritten area" 7). The image data is acquired by scanning handwriting inserted original document 60. The preconditioning section 110 includes a separating section 111, a circumscribed rectangle creating section 112, a location information acquiring section 113, and a determining section 114. The function of the preconditioning section 110 will be hereafter described with reference to FIG. 4, a view describing the function thereof.

The separating section 111 separates the handwritten area 7 (specifically, enclosing line 71 and class symbol 72) from the image data 61 acquired by scanning the handwriting inserted original document 60 (hereinafter referred to as "separating processing"). In the separating processing, the handwritten area 7 is separated from areas other than the handwritten area 7, that is, areas of line drawings printed on the original printed material before a user inserts any handwriting (the area is hereafter referred to as "printed area"). The data in which an area of the handwritten area 7 has been separated from the image data 61, that is, data displaying the printed area only, is hereafter referred to as "separated data" 62.

The separating processing can be, for example, executed using a density difference in each object included in the image data 61. In other words, a handwritten area has a tendency to have more areas whose density is lower than a printed area. By calculating an average density per object (for example, connected pixels) of the image data 61 and regarding an area whose average density is equal to or lower than a predetermined value as the handwritten area 7, the handwritten area 7 can be separated from the image data 61. Further, for example, the separating processing can be also executed using a change in the density of each object included in the image data 61. In other words, a density change of a handwritten area is likely to be more gradual than that of a printed area. Therefore, by calculating a changing rate of the average density per object (for example, connected pixels) of the image data 61 (an average of the density difference among adjacent pixels) and locating an area where the changing rate of the average density is equal to or lower than a predetermined value as the handwritten area 7, the handwritten area 7 can be separated from the image data 61. As described above, it is also possible to execute the separating processing by using information on each pixel of the image data 61 as well as the publicly-known techniques.

The circumscribed rectangle creating section 112 creates a rectangle enclosing each handwritten area 7 separated from the image data 61 (hereinafter referred to as "circumscribed rectangle" 81).

The location information acquiring section 113 acquires information on locations of each handwritten area 7 separated from the image data 61. More specifically, by calculating a coordinate of a center 82 of a circumscribed rectangle 81 created around each handwritten area 71, the location information acquiring section 113 acquires the coordinate as the information on the location of the handwritten area 7. For example, the location information acquiring section 113 may acquire a mean of an apex coordinate of a circumscribed rectangle 81 as a coordinate of a center 82.

The determining section 114 determines whether each of the handwritten areas 7 separated from the image data 61 is an enclosing line 71 or a class symbol 72. The determining section 114 includes a pixel counting section 1141 and a determination processing section 1142.

The pixel counting section 1141 counts pixels included in a region of a circumscribed rectangle 81 created around the handwritten area 71 of the separated data 62 (a region enclosed with a virtual line in the figure). The count obtained herein is approximately equal to the number of pixels stemming from line drawings within the region including the handwritten area 7 of the printed material.

As the enclosing line 71 is a handwritten area enclosing a line drawing on the printed material, relatively many pixels stemming from the line drawing of the printed material are to exist in a region of the handwritten area 7 written as the enclosing line 71. Accordingly, if it is specified as a rule inserting a class symbol 71 so as not to overlap with a line drawing on printed material, as long as a user draws a class symbol 72 in accordance with the rule, few pixels stemming from the line drawings thereon are to exist in the region of the handwritten area 71 into which the class symbol 72 is inserted. The determination processing section 1142 thus determines whether or not the number of pixels counted by the pixel counting section 1141 is higher than a predetermined threshold W1. If the number of pixels is higher than the threshold W1, the handwritten area 71 is identified as an enclosing line 71, and if the number of pixels is lower than the threshold W1, the handwritten area 71 is identified as a class symbol 72.

Fundamentally, it may be possible to set the threshold W1 used in the determination processing to zero. However, both a printed area and a handwritten area may be incorrectly recognized in an actual separating processing. Further, a user may insert a class symbol 72 to partially overlap with a line drawing on printed material. Furthermore, if a user inserts a class symbol 72 close to a printed area, the printed area would be slightly included in the circumscribed rectangle 81. Therefore, in order to discriminate the class symbol 72 and the enclosing line 71 accurately, it is preferable to specify the threshold W1 to a value which is slightly higher than zero.

Class Symbol Classifying Section 120

FIG. 3 will be again referred to. The class symbol classifying section 120 classifies class symbols 72 into groups according to the type of class symbols. Specifically, the class symbol classifying section 120 performs an optical character recognition (OCR) processing for class symbols 72, classifying the class symbols 72 into groups according to the recognition result, giving a discriminating number (for example, a group number) to each group. The OCR processing is performed, for example, by using a pattern matching technique for a plurality of patterns which have been previously registered.

However, in a case where a class symbol 72 is considered unrecognizable, the class symbol 72 may be classified into a defined group, or a subsequent processing may proceed as if the class symbol 72 does not exist.

Figure 7:
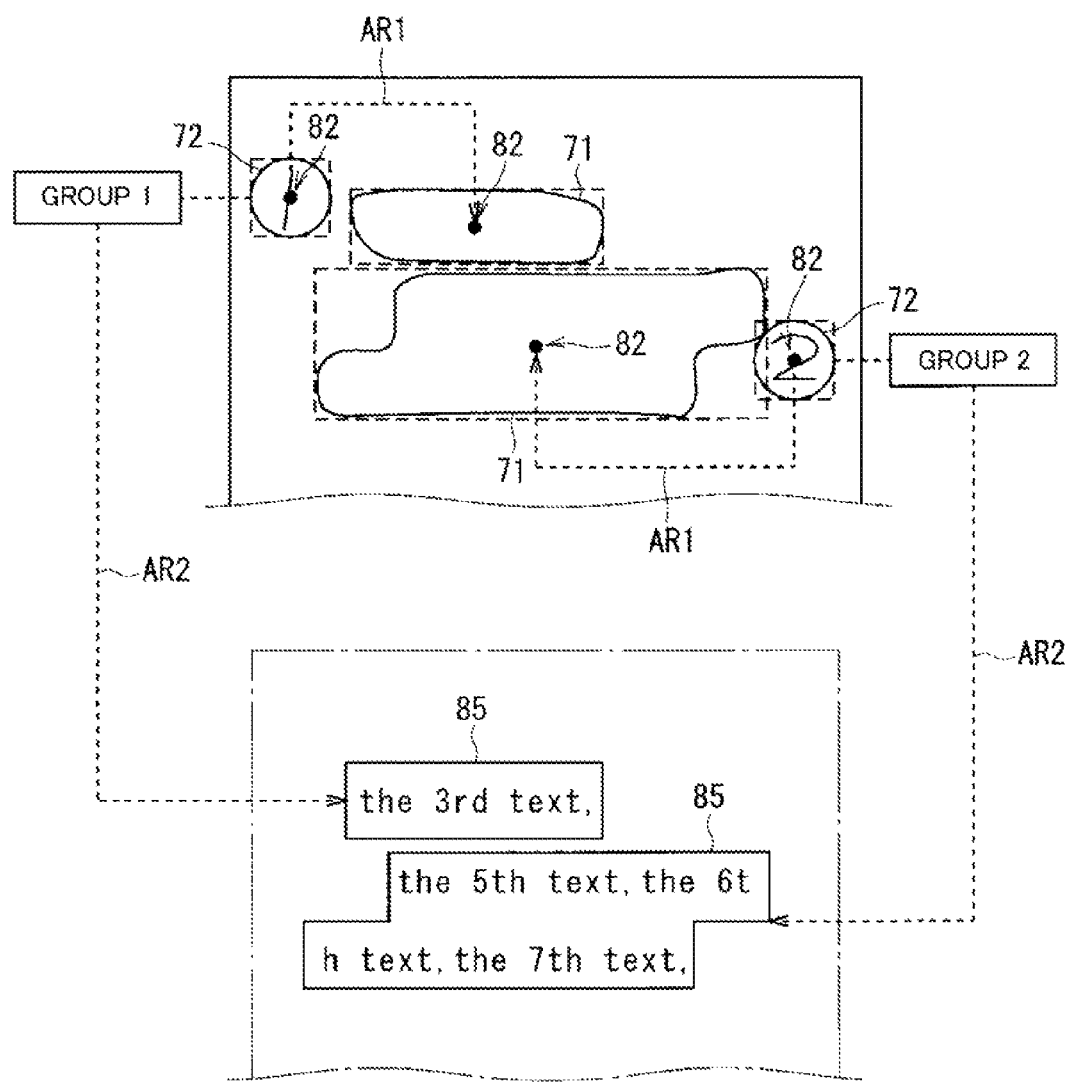
FIG. 7 is a view describing a function of an extracted image organizing section.

Recognition results obtained through the character recognition processing for a group of class symbols 72 may be a group of symbols which can be numbered. For example, if recognition result is a group of numbers, the results can be listed in ascending order or in descending order. If the recognition result is a group of alphabets, the results can be arranged in alphabetical order. If the recognition result is a group of Japanese hiragana or katakana, the results can be arranged in order of the 50-character Japanese syllabary. Where recognition result is a group of symbols which can be ordered, the class symbol classifying section 120 gives each result a group number corresponding to the order of the symbol. For example, if a recognition result obtained through the character recognition processing for a group of class symbols 72 is any one of "A", "B", or "C", the class symbol classifying section 120 gives a group number "1" to a group to which class symbols 72 having a recognition result "A" belong, a group number "2" to a group to which class symbols 72 having a recognition result "B" belong, and a group number "3" to a group to which class symbols 72 having a recognition result "C" belong, respectively. Further, for example, where handwriting inserted original document 60 illustrated in FIG. 2, a recognition result obtained through the character recognition processing for a group of class symbols 72 will be "1 in a circle", "2 in a circle" or "3 in a circle". In this case, the class symbol classifying section 120 gives a group number "1" to a group to which class symbols 72 having a recognition result "1 in a circle" belong, a group number "2" to a group to which class symbols 72 having a recognition result "2 in a circle" belong, and a group number "3" to a group to which class symbols 72 having a recognition result "3 in a circle" belong, respectively. (Refer to FIG. 7.)

Extracted Image Acquiring Section 130

The extracted image acquiring section 130 is a functional section to extract an image area from the separated data 62, and includes an extracted region identifying section 131 and an extract processing section 132. The function of the extracted image acquiring section 130 will be described with reference to FIGS. 5 and 6, both of which describe the function of the extracted image acquiring section 130.

Figure 5:
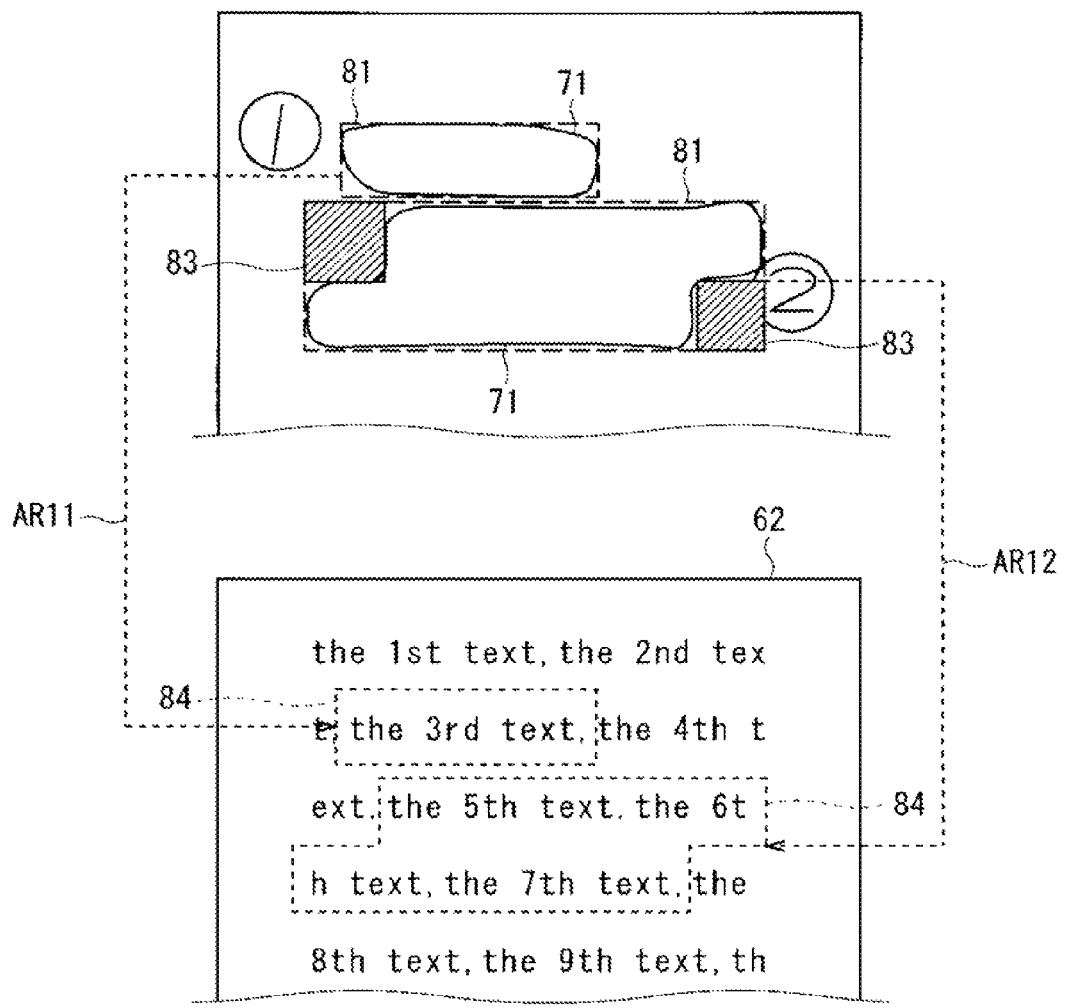
FIG. 5 is a view describing a function of an extracted image acquiring section.

The extracted region identifying section 131 identifies a region to be extracted from the separated data 62 (hereinafter referred to as "extract target region" 84). However, the extract target region 84 is defined as a region including a region which a user wants to extract (that is, a target region within an enclosing line 71.) Specifically, as illustrated in FIG. 5, the extracted region identifying section 131 determines whether an inscribed rectangle 83 whose size is larger than a predetermined threshold W2 can be created in a region between an enclosing line 71 and a circumscribed rectangle 81 created therearound. In a case where an inscribed rectangle 83 cannot be created therein, that is, smaller space exists between the enclosing line 71 and the circumscribed rectangle 81, the extracted region identifying section 131 regards a region within the circumscribed rectangle 81 as an extract target region 84 (AR11). Where one or more inscribed rectangles can be created, that is, a relatively large space exists between the moving boarder 71 and the circumscribed rectangle 81, the extracted region identifying section 131 regards a region in which all inscribed rectangles 83 created therein are removed from the circumscribed rectangle 81 as the extract target region 84 (AR12).

Figure 6:
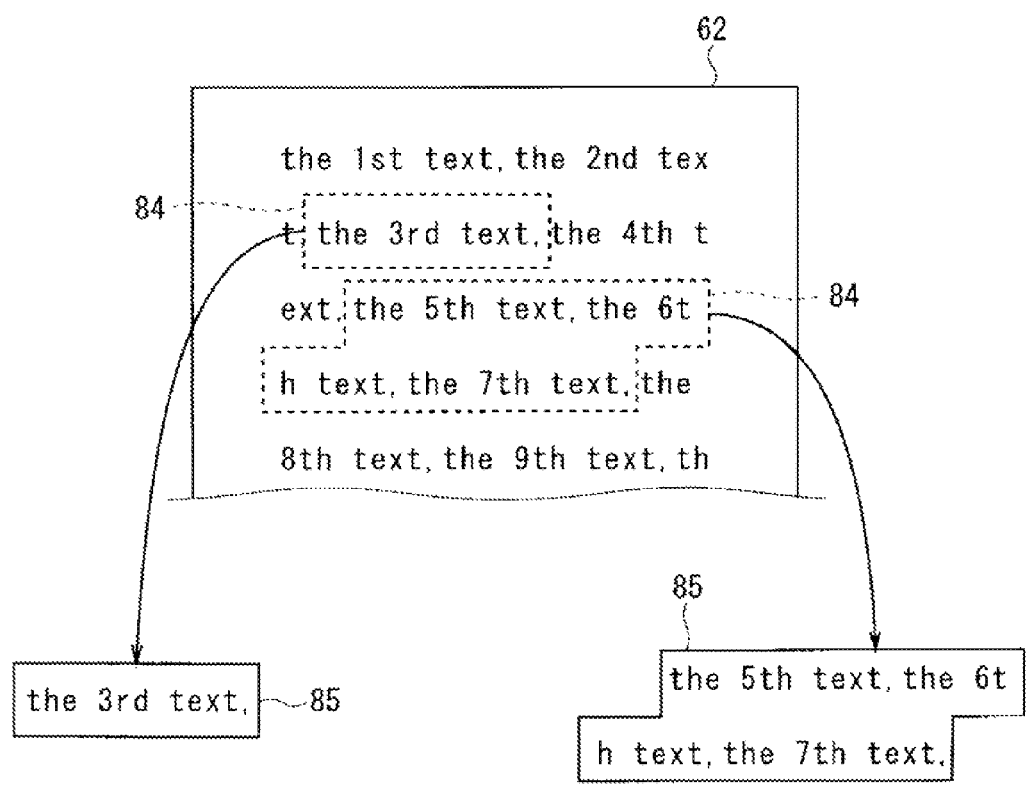
FIG. 6 is a view describing the function of the extracted image acquiring section.

As illustrated in FIG. 6, the extract processing section 132 extracts an image area in an extract target region 84 of the separated data 62. The image area extracted is hereafter referred to as "extracted image" 85.

Extracted Image Organizing Section 140

FIG. 3 will be again referred to hereafter. The extracted image organizing section 140 is a functional section to generate listed data 63 by classifying extracted images 85, and includes the corresponding section 141, the image classifying section 142, and the classified data generating section 143. The function of the extracted image organizing section 140 will be hereafter described with reference to FIG. 7, which is a view describing the function of the extracted image organizing section 140.

The corresponding section 141 correlates a class symbol 72 to an enclosing line 71 drawn nearest the class symbol 72. Specifically, the location information acquiring section 113 identifies an enclosing line 71, whose center 82 is located closest to a center 82 of a class symbol 72, among other enclosing lines 71 inserted on one page, using information on locations of each handwritten area 7. Then, the enclosing line 71 is regarded as an enclosing line 71 drawn nearest the class symbol 72 and is correlated to the class symbol 72 (refer to arrow AR1).

The image classifying section 142 classifies image areas (specifically, extracted image 85 of the image areas) enclosed with each of one or more enclosing lines 71 correlated to class symbols 72 belonging to the same group (that is, the same kind of class symbols 72) into groups. Specifically, the image classifying section 142 firstly identifies a class symbol 72 to which an enclosing line 71 enclosing an image area of an extracted image 85 is correlated. Then, if the enclosing line 71 is correlated to anyone of the class symbols 72, the corresponding section 141 gives a group number to which the correlated class symbol 72 belongs (refer to arrow AR2). Meanwhile, if the enclosing line 71 enclosing the extracted image 85 is not correlated to any one of class symbols 72, the corresponding section 141 gives a number specified for the extracted image (for example, group number 0.) In other words, image areas within an enclosing line 71 without a corresponding class symbol 72 are classified into one group.

Figure 8:
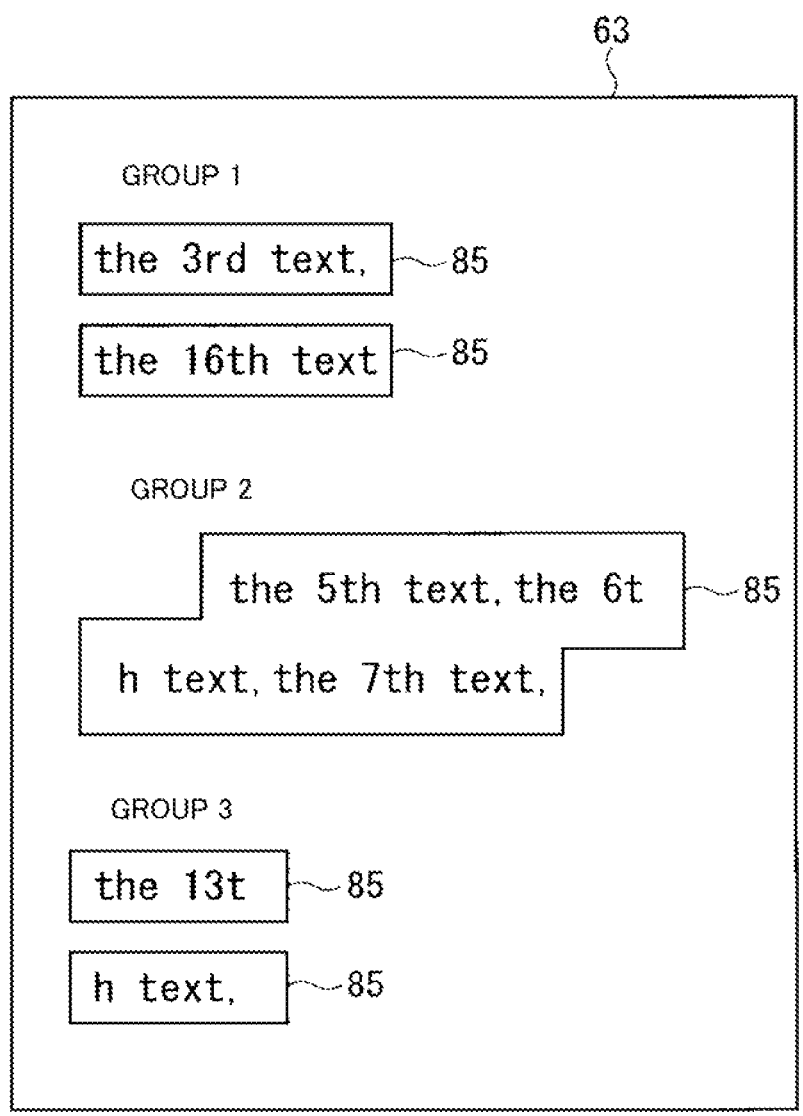
FIG. 8 is a view describing a structural example of listed data.
Figure 9:
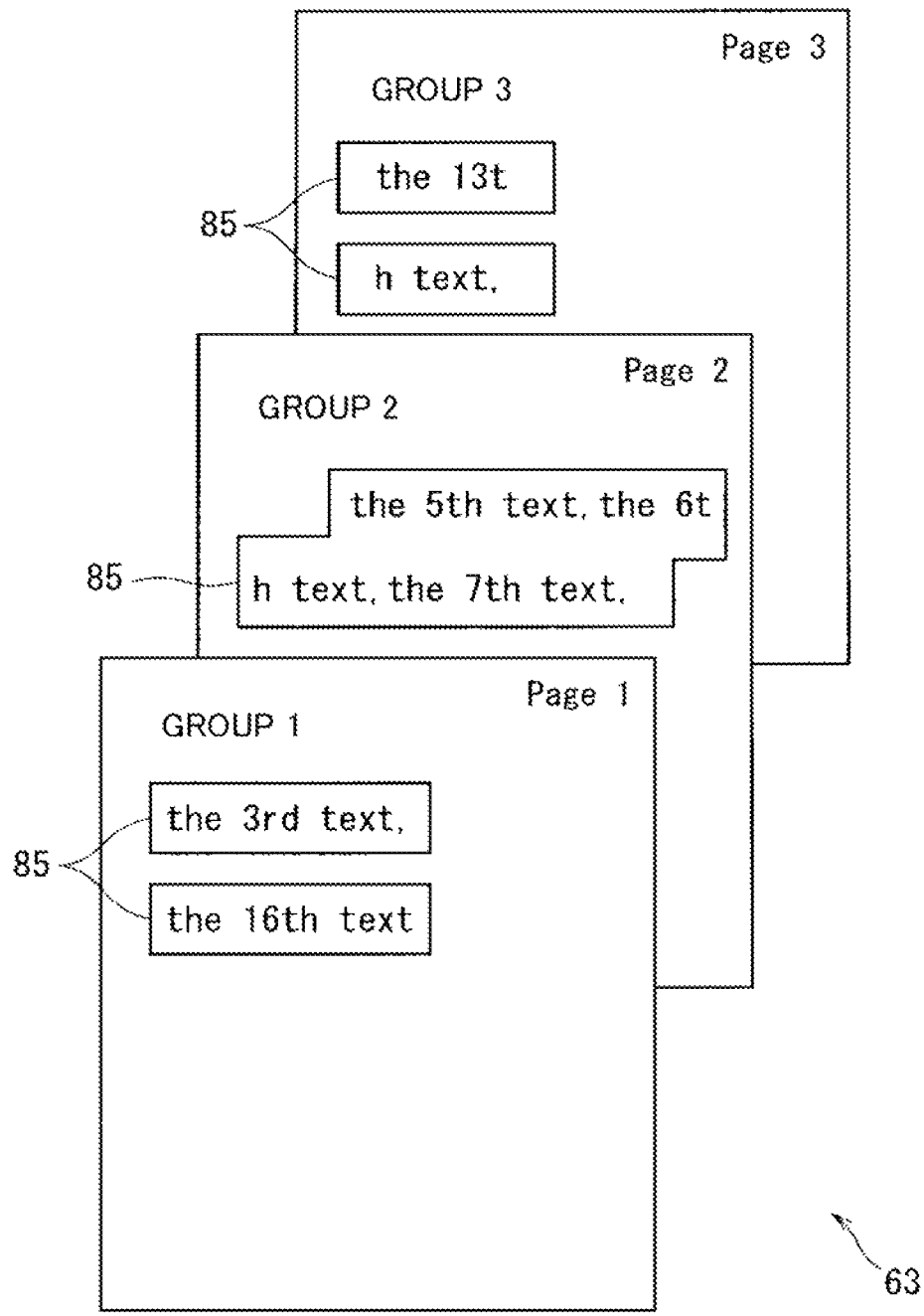
FIG. 9 is a view describing a structural example of the listed data.

The listed data generating section 143 organizes the extracted images 85 which have been classified into groups in the image classifying section 142, and also generates listed data 63 by arranging the data in ascending order of group numbers. FIGS. 8 and 9 illustrate structural examples of the listed data 63. As illustrated in FIGS. 8 and 9, in the listed data 63, extracted images 85 are classified into groups and arranged in ascending order of group numbers. As illustrated in FIG. 8, all groups of the listed data 63 may be displayed on the same screen, or as illustrated in FIG. 9, each group of the listed data 63 may be displayed on a different screen.

The generated listed data 63 is stored in, for example, a large capacity storing section 19. The listed data 63 stored in the large capacity storing section 19 is printed on a recording sheet in accordance with an instruction input from a user. The listed data 63 is also displayed on a display section 151 in accordance with an instruction input from a user.

3. Processing Flow

A flow of a series of processing steps according to the extract classifying function will be described hereafter. The processing described below starts when a user inputs instructions through an operation panel 15 to scan a handwriting inserted original document 60 with the image scanning section 17 and to generate listed data 63.

3-1. Processing by the Preconditioning Section 110

Figure 10:
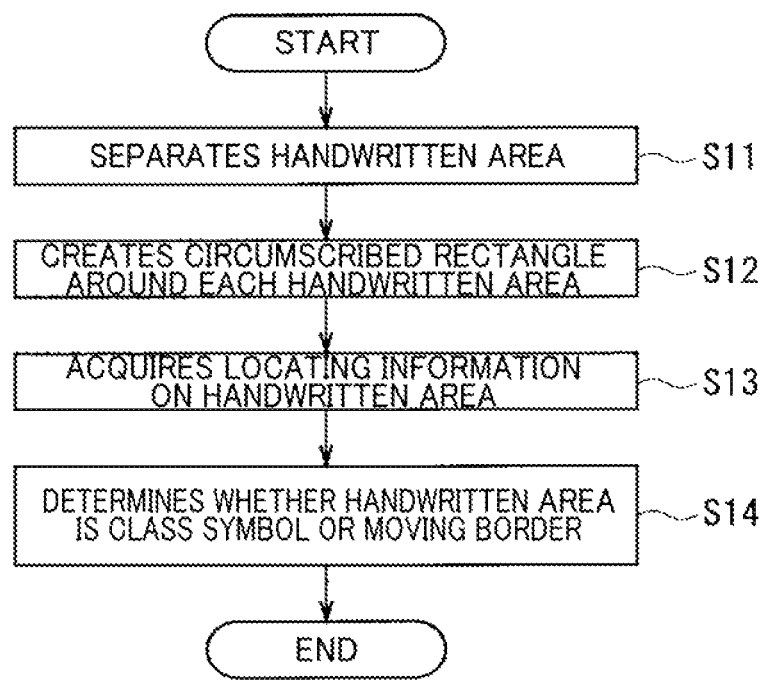
FIG. 10 is a flow chart describing preconditioning.

Firstly, preconditioning is performed by a preconditioning section 110. A flow of the preconditioning will be described with reference to FIG. 4 and FIG. 10. FIG. 10 is a flow chart describing preconditioning.

Once the image scanning section 17 obtains image data 61 of the handwriting inserted original document 60, the separating section 111 separates a handwritten area 7 from the image data 61 (step S11). If no handwritten area 7 is detected in step S11, the processing is terminated. Hereafter, descriptions will be made, provided that one or more handwritten areas 7 are detected in step S11.

Once one or more handwritten areas 7 are separated from the image data 61, the circumscribed rectangle creating section 112 creates a circumscribed rectangle 81 around each handwritten areas 7 separated from the image data 61 (step S12).

Then, the location information acquiring section 113 acquires information on locations of each of one or more handwritten areas 7 separated from the image data 61 (step S13). Specifically, the location information acquiring section 113 calculates a coordinate of the center 82 of the circumscribed rectangle 81 created around each handwritten area 7 in step S12 and acquires the data as the information on locations of the handwritten areas 7.

Figure 11:
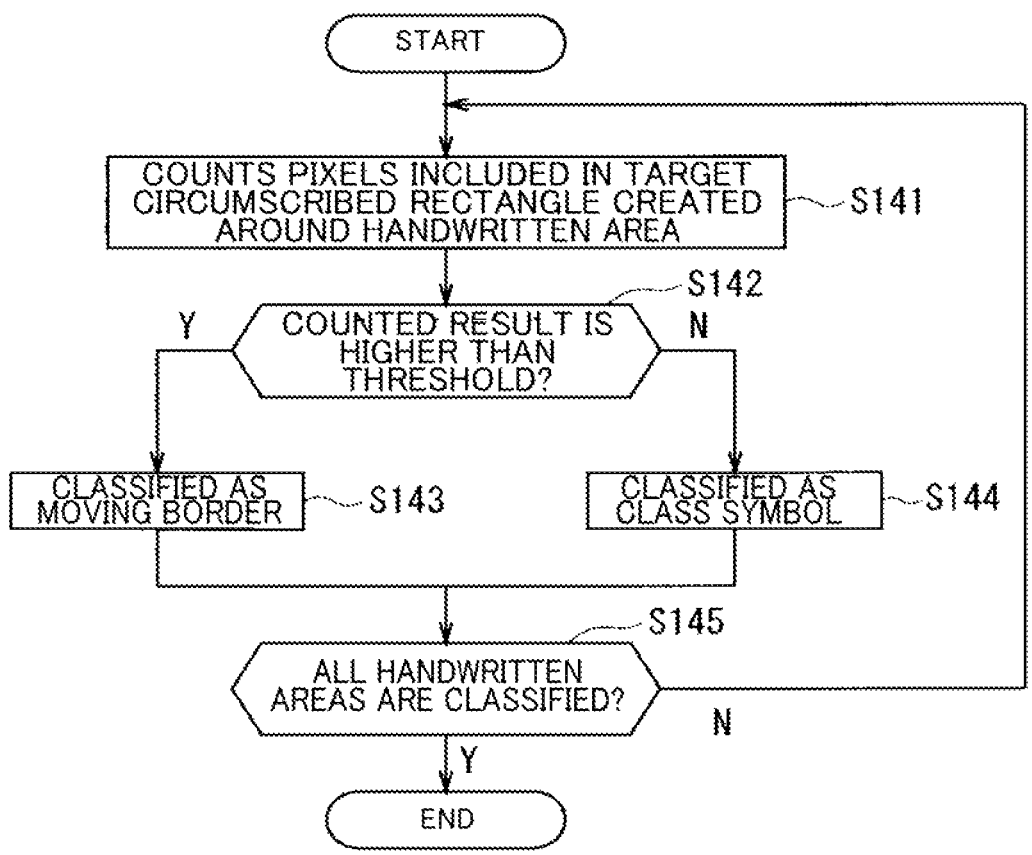
FIG. 11 is a flow chart describing a step of determining a handwritten area.

Then, the determining section 114 determines whether each of one or more handwritten areas 7 separated from the image data 61 is an enclosing line 71 or a class symbol 72 (step S14). A specific description will be made hereafter with reference to FIG. 11, a flow chart describing a series of the processing steps.

First, a pixel counting section 1141 regards one of handwritten areas 7 as a determination target, and counts pixels included in a region of the target circumscribed rectangle 81 created around the handwritten area 7 of the separated data 62 (step S141).

Then, the determination processing section 1142 determines whether the count in step S141 is higher or lower than a predetermined threshold W1 (step S142.) Where the determination processing section 1142 determines that the count is higher than the predetermined threshold W1, the target handwritten area 7 is classified as an enclosing line 71 (step S143). Meanwhile, where the determination processing section 1142 determines that the count is lower than the predetermined threshold W1, the target handwritten area 7 is classified as a class symbol 72 (step S144).

After the steps from S141 to S144 are performed for all of one or more handwritten areas 7 separated from the image data 61 (in step S145, the answer is "YES"), the processing of step S14 is terminated.

When the processing of step S14 is terminated, the preconditioning is completed, and then a different processing is initiated for both a handwritten area 71 which is classified as a class symbol 72 and a handwritten area which is classified as an enclosing line 71.

3-2. Processing by the Class Symbol Classifying Section 120

Figure 12:
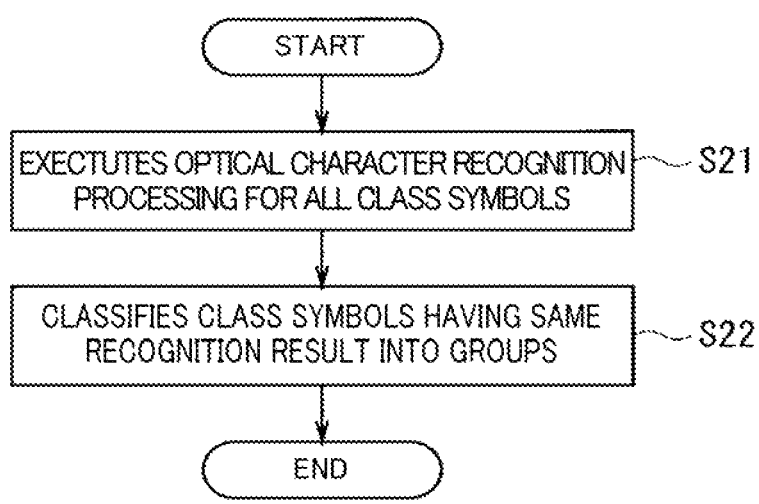
FIG. 12 is a flow chart describing a step of handling a class symbol.

A description will be made on a flow of the processing performed by the class symbol classifying section 120 to the handwritten area 7 which is classified as a class symbol 72, with reference to FIG. 12, a flow chart of the processing for class symbols.

Firstly, the class symbol classifying section 120 performs an optical character recognition processing for all handwritten areas 7 which are classified as a class symbol 72 (step S21).

Next, the class symbol classifying section 120 classifies class symbols 72 into groups according to the result of the recognition in step S21, and gives a group number to each group (step S22).

3-3. Processing by the Extracted Image Acquiring Section 130

Figure 13:
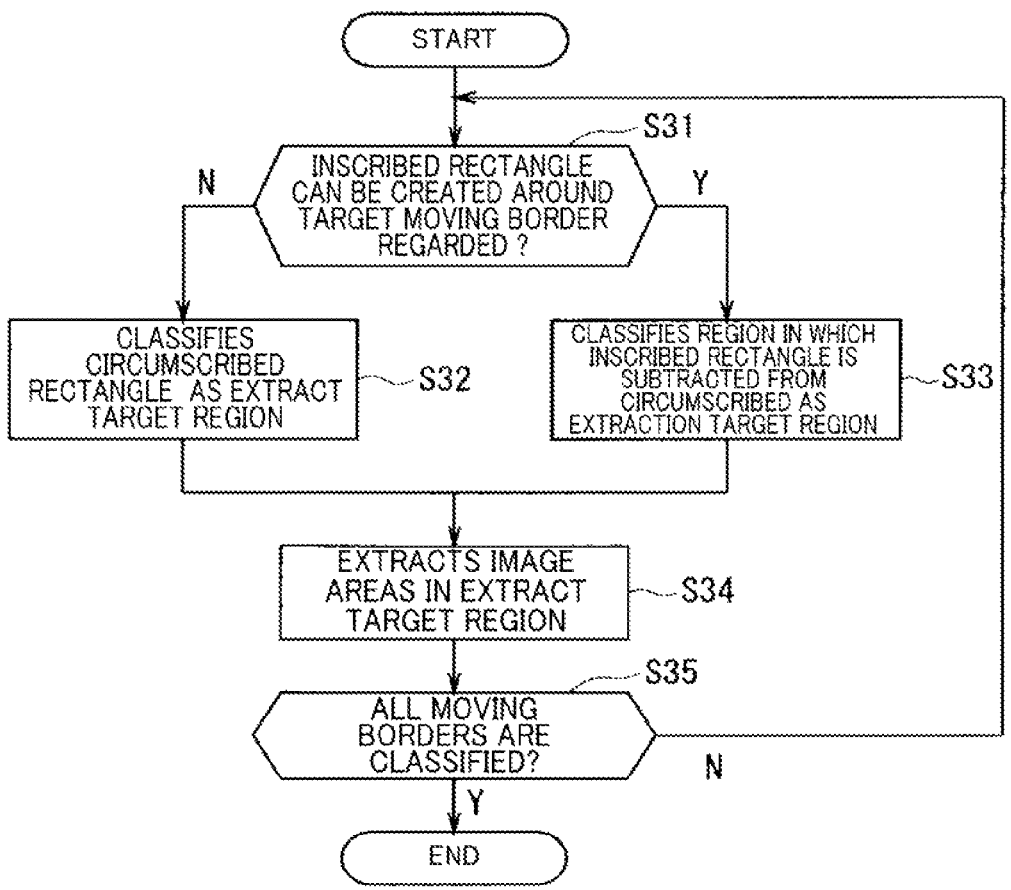
FIG. 13 is a flow chart describing a step of handling an enclosing line.
Figure 14:
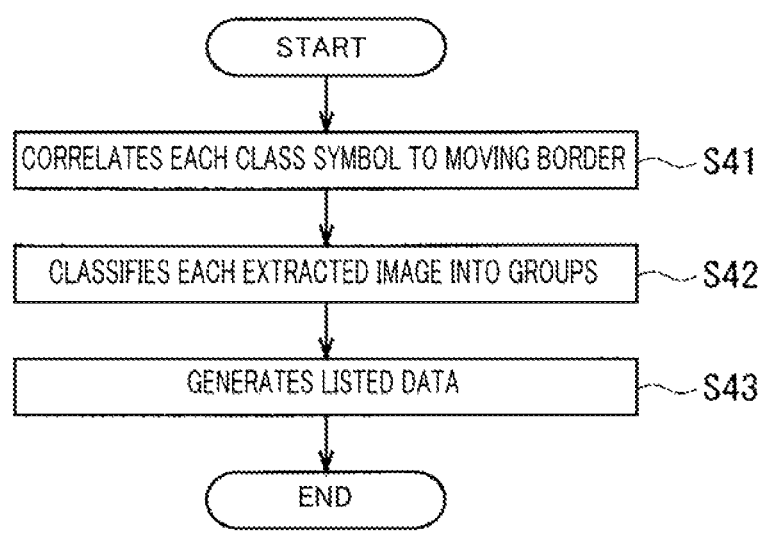
FIG. 14 is a flow chart describing a step of generating listed data.

With reference to FIGS. 5, 6 and 13, descriptions will be made on the flow of processing performed by the extracted image acquiring section 130 for handwritten sections 7 which are classified as an enclosing line 71.

Firstly, the extracted region identifying section 131 identifies any one of enclosing lines 71 as a target and determines whether or not an inscribed rectangle 83 whose size is bigger than the predetermined threshold W2 can be created in a region between the enclosing line 71 and a circumscribed rectangle 81 created therearound (step S31).

Where an inscribed rectangle 83 cannot be created (in step S31, the answer is "NO"), the extracted region identifying section 131 determines that the circumscribed rectangle 81 is an extract target region 84 (step S32).

Where one or more of inscribed rectangles 83 can be created (in step S31, the answer is "YES"), the extracted region identifying section 131 determines that the region in which all of one or more inscribed rectangles 83 created therein are removed from the circumscribed rectangle 81 is the extract target region 84 (step S33).

Then, the extract processing section 132 extracts image areas in the extract target region 84 of the separated data 62 (that is, the region which is classified as the extract target region 84 in step S32 or S33) and acquires the image areas as the extracted image 85 (step S34).

After the extracted images 85 related to all of the handwritten areas 71 which are classified as an enclosing line 71 are acquired (in step S35, the answer is "YES"), the processing step is terminated.

3-7. Processing by the Extracted Image Organizing Section 140

After each processing step for the handwritten area 7 classified as a class symbol 72 and the handwritten area 7 classified as an enclosing line 71 is completed, the extracted image organizing section 140 classifies the extracted images 85 to generate listed data 63. The flow of the processing will be described with reference to FIGS. 7, 8, 9 and 14, which is a flow chart describing the processing.

Firstly, the corresponding section 141 correlates all of the class symbols 72 separated from image data 61 to an enclosing line 71 which has been drawn nearest each class symbol 72 (step S41). Specifically, among enclosing lines 71 drawn on the same page as the page where each class symbol 72 is drawn, the corresponding section 141 identifies an enclosing line 71 whose center 82 is located closest to the center 82 of the class symbol 72 using the information on locations of each handwritten area 7 which has been acquired in step S13 (refer to FIG. 10). Then, the corresponding section 141 regards the enclosing line 71 as the nearest enclosing line 71 to a class symbol 72 and then correlates the enclosing line 71 to the class symbol 72.

Then, the image classifying section 142 classifies all of the extracted images 85 acquired into groups. Specifically, the image classifying section 142 classifies the extracted images 85 of the image area within each of one or more enclosing lines 71 which are correlated to class symbols 72 belonging to the same group, according to the kind of class symbol 72. Further, in a case where there exists an image area that is within an enclosing line 71 without a class symbol 72, the image classifying section 142 organizes the image area(s) into one group.

Then, the listed data generating section 143 organizes the extracted images 85 which have been grouped in step S42 according to the kind of class symbol, and arranges the groups in ascending order of the group number to generate the listed data 63 (step S43).

4. Effect

According to the above-described embodiment of the present invention, a handwritten area 7 separated from image data 61 is identified as an enclosing line 71 or a class symbol 72, and an image area in an extract target region 84 enclosed with the handwritten area 7 which is classified as an enclosing line 71 is extracted. The extracted image areas are classified into groups of the image area within one or more of enclosing lines 71 correlated to the same kind of class symbols 72, and are organized to generate the listed data 63. According to the above configuration, only a specific area that a user wants to extract can be extracted from the data of printed material, and the extracted data can be organized as the listed data as desired by the user.

According to the above-described embodiment of the present invention, the handwritten area 7 of the separated data 62 is identified as an enclosing line 71 or a class symbol 72 based on the number of pixels included in a region of a circumscribed rectangle 81 created around the handwritten area 7. In order to accurately calculate the number of pixels included in the region of the handwritten area 7 in the separated data 6, a location and a shape of the handwritten area 7 need to be identified accurately. As an enclosing line 71 may be often of an irregular shape handwritten by a user, the volume of data processing and information to be stored is significantly larger in trying to identify the location and the shape of the enclosing line exactly. In contrast, in the embodiment described above, as the handwritten area 7 is identified as an enclosing line 71 or a class symbol 72 using a simple shape of the circumscribed rectangle 81 around the handwritten area 7, the determination can be easily and accurately executed.

According to the above-described embodiment of the present invention, a region enclosed with a circumscribed rectangle 81 created around an enclosing line 71 is defined as an extract target region 84. For example, as described above, if an image area of an enclosing line 71 is regarded as an extract target region as is, the volume of data processing and information to be stored is significantly larger as the location and the shape of the handwritten area 7 need to be exactly identified. In contrast, in the embodiment described above, by using a simple shape of a circumscribed rectangle, a region which a user wants to extract can be easily and exactly extracted. Further, the configuration has an advantage in extracting a region which a user wants without difficulty even if a line of an enclosing line has not been completely drawn by the user. For example, when taking out text data, a user often wants to completely extract all sentences included in an enclosing line 71 only, and therefore there is little need to cut off an image area along the enclosing line 71 as is. In other words, the user hardly feels any inconvenience if including as an extract target region 84 a region that is determined not as an image area within the enclosing line 71. Such determination is based on a circumscribed rectangle 81 created around the enclosing line 71.

In particular, in the above-described embodiment of the present invention, where a predetermined or larger size of an inscribed rectangle 83 can be created in a region between an enclosing line 71 and a circumscribed rectangle 81, an image area which the inscribed rectangle 83 is removed from the circumscribed rectangle 81 is regarded as an extract target region 84. In a case where an inscribed rectangle 83 cannot be created therein, a region enclosed within the circumscribed rectangle 81 is regarded as the extract target region 84. The above configuration lowers the possibility that a region which a user does not want to extract is included in the extract target region 84. In other words, a region which the user wants to extract can be easily and accurately identified.

In particular, in the above-described embodiment of the present invention, the center 82 of a circumscribed rectangle 81 created around a handwritten area 7 is acquired as location information thereof, and an enclosing line 71 drawn nearest a class symbol 72 is identified based on the location information. According to the configuration, as a location of each handwritten area 7 is easily and exactly identified using a simple shape of a circumscribed rectangle 81, a class symbol 72 can be easily and accurately correlated to an enclosing line 72.

B. Second embodiment

1. Image Processing System 100

Figure 15:
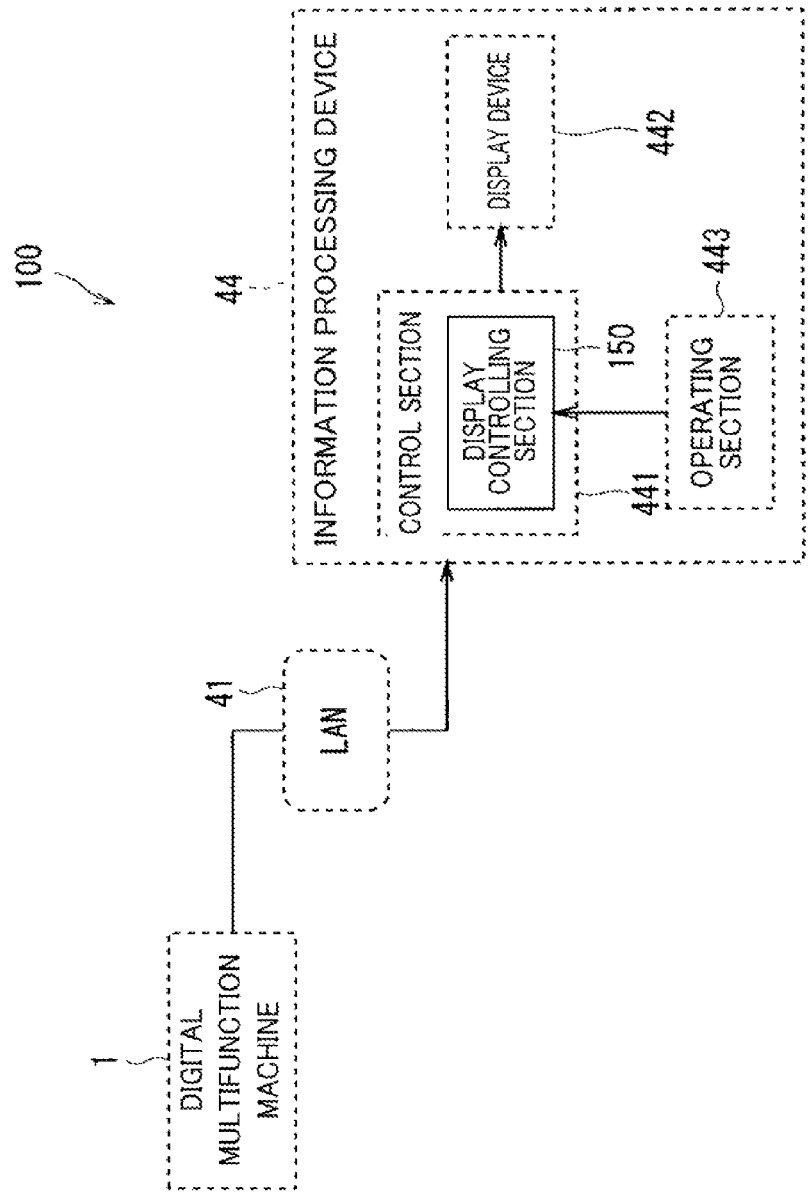
FIG. 15 is a block diagram illustrating a functional structure included in an image processing system.

An image processing system 100 according to a second embodiment of the present invention will be hereafter described with reference to FIG. 15, a block diagram illustrating a functional structure of the image processing system.

The image processing system 100 includes the digital multifunction machine 1 according to the first embodiment of the present invention, and one or more of information processing devices connected to the digital multifunction system 1 via a communication line. For example, the image processing system 100 includes the digital multifunction machine 1 and an information processing device 44 (personal computer, etc.) connected to the digital multifunction system 1 via a LAN 41. A configuration of the image processing system 100 is not limited to the above-described configuration. The image processing system 100 may also include an information processing device 45 connected to the digital multifunction machine 1 via the Internet 43, or may include the information processing device 45 instead of the information processing device 44 (refer to FIG. 1).

The information processing device 44 is equipped with, for example, a computer, and includes a control section 441 that performs each function of the information processing device 44 consisting of a CPU, a ROM, a RAM or the like, a display device 442 such as a display monitor, a mouse which is used by an operator to input each instruction, and an operating section 443 consisted of a keyboard or the like. Although a figure is omitted, the information processing device 44 also includes a ROM and a LAN 41 that store a program and the like to execute each function thereof, a communication section that is an interface to transmit/receive data to/from the digital multifunction machine 1 or the like connected via a communication line such as the Internet 43, and a memory device that stores image data received from other devices via a communication line (for example, listed data 63 that the communication section obtains from the digital multifunction machine 1 via the LAN 41).

The image processing system 100 is capable of displaying the listed data 63 generated by the digital multifunction machine 1 on the display device 442 of the information processing device 44. The information processing device 44 includes a display controlling section 150 as a functional structure related to a display processing of the listed data 63. The display controlling section 150 functions upon execution of a program on the ROM by the control section 441.

The display controlling section 150 reads out the listed data 63 received from the digital multifunction machine 1 to display the listed data 63 on the display device 442. FIG. 16 is a view illustrating an example of the display screen (hereinafter referred to as "indication display" 9.)

On the indication display 9, extracted images 85 which belong to the same group (listed data indicating area 91) are displayed as a list. That is, users are able to specify a group to be displayed on the listed data indicating area 91. In other words, when a user inputs an instruction through the operating section 443 to display a group which the user wants to indicate, the display controlling section 150 displays the extracted image 85 which belongs to the group specified on the listed data indicating area 91 upon receipt of the instruction.

Further, next to the listed data indicating area 91 (original material indicating area 92) is shown the original printed material in which a user has inserted handwriting is displayed. In other words, the display controlling section 150 acquires the separated data 63, which has been used to generate listed data 63, from the digital multifunction machine 1 and displays the acquired separated data 63 on the original material indicating area 92. As the separated data 62 is displayed beside the listed data 63, the user can easily recognize a location of the original printed material where the extracted image 85 is located.

Furthermore, it is preferred that an extract target region 84 corresponding to the extracted image 85 displayed on the listed data indicating area 91 is indicated by, for example, a colored line, on the original material indicating area 92. According to the above configuration, the user can easily recognize a location of the original printed material where the extracted image 85 displayed on the listed data indicating area 91 is located.

Where the original printed material contains a plurality of pages, the original material indicating area 92 may display a page including one extracted image 85 which a user has selected from among extracted images 85 displayed on the listed data displaying section 91. In other words, when a user selects one extracted image 85 from among the extracted images 85 displayed on the listed data indicating area 91 through the operating section 443, the display controlling section 150 may receive an instruction input by the user and display the page including the extracted image 85 selected from the separated data 62 on the original material indicating area 92.

It is also preferred that where a user have selected one extracted image 85, the following information including a location where the selected extracted image 85 is located on the original printed material is displayed on a location information indicating area 93: for example, a page number of the original printed material where the extracted image 85 is located, a location indicating an original location of the extracted image 85 is located (for example, "right", "left", "upper" or "lower" of the page.

Furthermore, an area indicating the number of extracted images 94 of the indication display 9 may display the following information: the number of extracted images 85 (which belong to a group displayed on the listed data indicating area 91) included in a whole original document and the number of extracted images 85 (which belong to a group displayed on the listed data indicating area 91) included in a page displayed on the original material indicating area 92.

The indication display 9 may display the following icons to control the indication of the display: for example, an icon 95 to display a previous group on the listed data indicating area 91, an icon 96 to display a following group on the listed data indicating area 91, an icon 97 to display a printing list of the listed data 63, or an icon 98 to terminate a display.

2. Effects

According to the above described embodiment of the present invention, the information processing device 44 connected to the digital multifunction machine 1 includes a display device 442 and the display controlling section 150 to display the listed data 63 on the display device 442. Such a configuration allows users to display the listed data 63 prepared with the digital multifunction machine 1 on a display device 442 of another information processing device 44.

C. Alternative Example

In the above-described embodiment of the present invention, the determining section 114 determines whether a handwritten area 7 of separated data 62 is an enclosing line 71 or a class symbol 72 based on the number of pixels included in a region enclosed with a circumscribed tangle 81 created around the handwritten area 7. Instead, the determining section 114 may determine whether a handwritten area 7 of image data 61 is an enclosing line 71 or a class symbol 72 based on an average pixel density enclosed within a circumscribed rectangle 81 created around the handwritten area 7. In other words, where the average pixel density (a value calculated by dividing the number of pixels included in a region of the circumscribed rectangle 81 by the size of the circumscribed rectangle 81) is higher than a predetermined threshold, the handwritten area 7 is classified as an enclosing line 71. Further, in a case where the average pixel density is lower than the predetermined threshold, the handwritten area 7 is classified as a class symbol 72.

According to the second embodiment of the present invention, the image processing system 100 consists of the digital multifunction machine 1 and the information processing device 44 and the listed data 63 generated with the digital multifunction machine 1 is displayed on the display device 442 provided in the information processing device 44. As stated before, the listed data 63 generated by the digital multifunction machine 1 may be displayed on the display section 151 thereof. In this case, the display controlling section 150 described above also functions in the digital multifunction machine 1. (Specifically, the display controlling section 150 functions by execution of a program on the ROM by the control section 11 of the digital multifunction machine 1. The configuration allows users to display the listed data 63 generated by the digital multifunction machine 1 on the display section 151 therein.

Further, in the image processing system 100, one or more of functioning sections (preconditioning section 110, class symbol classifying section 120, extracted image acquiring section 130, extracted image organizing section 140), which function in the digital multifunction machine 1, may function in the control section 441 of the information processing device 44.

In the above described embodiment of the present invention, the digital multifunction machine 1 acquires image data 61 by scanning a handwriting inserted original document 60 with the image scanning section 17. However, a structure capable of acquiring the image data 61 is not limited to this. For example, the image data 61 may be received from the information processing devices 44 or 45 via a communication line such as a LAN 41 or the like. Alternatively, the image data 61 may be received as a facsimile from the communication terminal device 47 connected via the line 46.

Further, in the above described embodiment of the present invention, a step of the processing of the digital multifunction machine 1 is not limited to the order described so far. For example, a handwritten area 7 may be identified as an enclosing line 71 or a class symbol 72 before location information of the handwritten area 7 is acquired in a preconditioning step. Each processing step described above may be executed simultaneously.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image processing apparatus comprising:
 a separating section wherein said separating section separates a handwritten area from image data of printed material in which handwriting has been inserted;
 a determining section wherein said determining section determines whether the handwritten area includes an enclosing line enclosing a target region of the printed material or and a class symbol classifying the target region;
 a corresponding section wherein said corresponding section correlates the class symbol to the enclosing line drawn nearest the class symbol;
 an extracted image acquiring section wherein said extracted image acquiring section acquires from the image data of the printed material an image area in an extract target region including the target region within the enclosing line;
 an image classifying section wherein said image classifying section classifies into groups the image area within the enclosing line according to the correlated class symbol;
 a listed data generating section wherein said listed data generating section generates listed data including the image area that has been classified into groups;
 a circumscribed rectangle creating section wherein said circumscribed rectangle creating section creates a circumscribed rectangle around the handwritten area;
 a location information acquiring section wherein said location information acquiring section acquires information on locations of each handwritten area separated from image data; and
 a coordinate of a center of each circumscribed rectangle around each handwritten area is calculated to determine the location of the handwritten area.

2. The image processing apparatus according to claim 1, wherein the determining section determines whether the handwritten area is an enclosing line or a class symbol based on the number of pixels included in a region enclosed within the circumscribed rectangle.

3. The image processing apparatus according to claim 1,
wherein if a space between the enclosing line and the circumscribed rectangle is larger than a predetermined threshold,
the extracted image acquiring section regards as the extract target region a region enclosed within the circumscribed rectangle after removing from the circumscribed rectangle one or more inscribed rectangles created in the space; and
wherein if the space between the enclosing line and the circumscribed rectangle is smaller than the predetermined threshold, the extracted image acquiring section regards as the extract target region a region enclosed within the circumscribed rectangle.

4. The image processing apparatus according to claim 1, further comprising
wherein the corresponding section identifies the enclosing line drawn nearest the class symbol based on the location information on the handwritten area.

5. The image processing apparatus according to claim 1, further comprising a display device; and
a display controlling section wherein said display controlling section uses the display device to display the listed data thereon.

6. An image processing system comprising;
an image processing apparatus; and
an information processing device connected to the image processing apparatus via a communication line;
wherein the image processing apparatus includes a separating section for separating a handwritten area from image data of a printed material in which handwriting has been inserted;
a determining section for determining whether the handwritten area includes an enclosing line enclosing a target region of the printed material or a class symbol classifying the target region;
a corresponding section for correlating the class symbol to the enclosing line drawn nearest the class symbol;
an extracted image acquiring section for acquiring from the image data of the printed material an image area in an extract target region including the target region within the enclosing line;
an image classifying section for classifying into groups the image area within the enclosing line according to the correlated class symbol;
a listed data generating section for generating listed data including the image area that has been classified into groups;
a circumscribed rectangle creating section for creating a circumscribed rectangle around the handwritten area;
a location information acquiring section wherein said location information acquiring section acquires information on locations of each handwritten area separated from image data; and
a coordinate of a center of each circumscribed rectangle around each handwritten area is calculated to determine the location of the handwritten area;
wherein the information processing apparatus includes a display device; and
a display controlling section for using the display device to display the listed data acquired from the image processing apparatus via the communication line in the display device.

7. The image processing system according to claim 6,
wherein the determining section determines whether the handwritten area is an enclosing line or a class symbol based on the number of pixels included in a region enclosed within the circumscribed rectangle.

8. The image processing system according to claim 6,
wherein if a space between the enclosing line and the circumscribed rectangle is larger than a predetermined threshold, the extracted image acquiring section regards as the extract target region a region enclosed within the circumscribed rectangle after removing from the circumscribed rectangle one or more inscribed rectangles created in the space; and
wherein if the space between the enclosing line and the circumscribed rectangle is smaller than the predetermined threshold, the extracted image acquiring section regards as the extract target region a region enclosed within the circumscribed rectangle.

9. The image processing system according to claim 6,
wherein the corresponding section identifies the enclosing line drawn nearest the class symbol based on the location information on the handwritten area.

10. The image processing system according to claim 6,
wherein the image processing apparatus includes a display device and a display controlling section for displaying the listed data on the display device.

11. A method for processing images, comprising the steps of:
separating a handwritten area from image data of a printed material in which handwriting has been inserted;
determining whether the handwritten area includes an enclosing line enclosing a target region in the printed material or a class symbol classifying the target region;
correlating the class symbol to the enclosing line drawn nearest the class symbol;
extracting from the image data of the printed material an image area in an extract target region including the target region within the enclosing line;
grouping the image area within the enclosing lines according to the correlated class symbol; and
generating listed data including the image area extracted and classified into groups;
creating a circumscribed rectangle around the handwritten area; and
calculating a coordinate of a center of each circumscribed rectangle around each handwritten area to determine the location of the handwritten area.

12. The image processing method according to claim 11,
wherein the handwritten area is determined as an enclosing line or a class symbol based on the number of pixels included in a region enclosed within the circumscribed rectangle.

13. The image processing method according to claim 11,
wherein if a space between the enclosing line and the circumscribed rectangle is larger than a predetermined threshold, a region within the circumscribed rectangle after removing the inscribed rectangle created therein is regarded as the extract target region; and
wherein if the space between the enclosing line and the circumscribed rectangle is smaller than the predetermined threshold, the region within the circumscribed rectangle is regarded as the extract target region.

14. The image processing method according to claim 11,
wherein the enclosing line drawn nearest the class symbol is identified based on the location information on the handwritten area.

15. The image processing method according to claim 11, further comprising:
a step of displaying; and
a step of controlling display of the listed data on the display device.

16. The image processing apparatus according to claim 1, wherein said determining section determines whether the handwritten area includes an enclosing line enclosing a target region of the printed material and a class symbol classifying the target region.

17. The image processing system according to claim 6, wherein said determining section for determining whether the handwritten area includes an enclosing line enclosing a target region of the printed material and a class symbol classifying the target region.

18. The method for processing images according to claim 11, wherein said determining step determines whether the handwritten area includes an enclosing line enclosing a target region in the printed material and a class symbol classifying the target region.

\* \* \* \* \*